No. 800,615. PATENTED SEPT. 26, 1905.
A. LUTZMANN.
MEAT SLICING MACHINE.
APPLICATION FILED MAY 11, 1905.

Witnesses: Inventor;

UNITED STATES PATENT OFFICE.

ALBERT LUTZMANN, OF WINZ, NEAR HATTINGEN, GERMANY, ASSIGNOR TO THE FIRM OF VEREINIGTE FLAUSCHENFABRIKEN & STANZWERKE AKTIEN-GESELLSCHAFT, OF HATTINGEN, GERMANY.

MEAT-SLICING MACHINE.

No. 800,615.      Specification of Letters Patent.      Patented Sept. 26, 1905.

Application filed May 11, 1905. Serial No. 259,993.

*To all whom it may concern:*

Be it known that I, ALBERT LUTZMANN, a citizen of the German Empire, residing at Winz, near Hattingen, in the Province of Westphalia and Kingdom of Prussia, Germany, have invented certain new and useful Improvements in Meat-Slicing Machines, of which the following is a specification.

This invention relates to improved means for holding or fixing the piece of meat—ham, for instance—which is to be cut in thin slices upon the sliding table of a meat-slicing machine. For this purpose a pillar or standard is fixed on one side of the sliding table, and to this standard is linked or otherwise held movably in a vertical direction an arm reaching crosswise over the table about to the middle of the same. To the end of this arm is suitably fixed a pressure-plate which can be pressed down upon the piece of meat to be cut and which can adjust itself to a certain extent to the shape of the piece of meat, so as to hold the same securely on the table.

Figure 1:
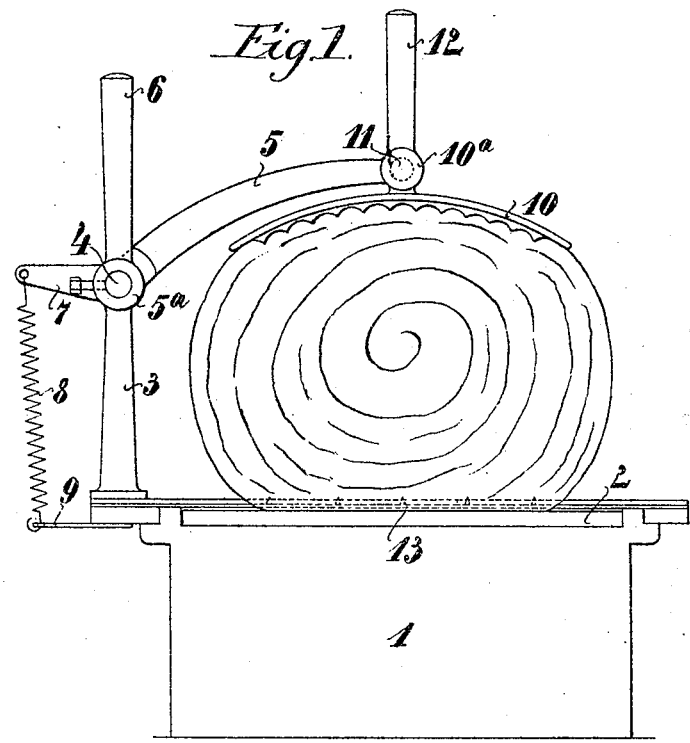
Figure 2:
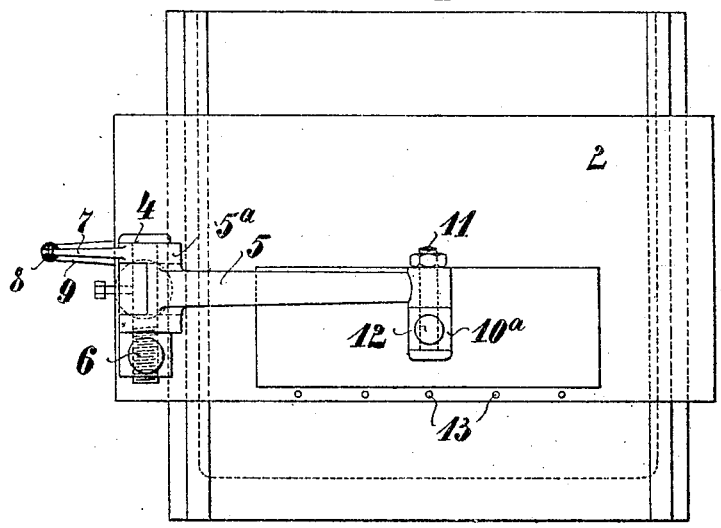

On the accompanying drawings, Figure 1 shows the new device in elevation, and Fig. 2 in plan.

By 1 is indicated the pedestal of the machine, upon which is held movably to and fro the sliding table 2. On one side of this table is fixed a pillar or standard 3, holding in its upper end on a pin 4, which is connected rigidly with it, the arm 5 by means of the forked head 5ª of the latter, so that it can swing up and down round the pin 4. At one end the pin 4 is provided with a head. At the other it is extended beyond the edge of the arm 5, and here it is screw-threaded and a handle 6 is screwed thereon, and it will thus be understood that when the handle 6 is screwed tight against the head 5ª this will be also fixed rigidly to the pillar 3. A finger 7 extends from the head 5ª in opposite direction to the arm 5 and to its end is fixed a spring 8, connected by its other end to a bracket 9, extending from the table 2, so that when the handle 6 is loosened the spring 8 will pull the arm 5 upward. To the outer or free end of this arm is linked a curved pressure-plate 10 by means of an eye 10ª and a bolt 11, and a handle 12 is arranged on the eye 10ª, and it will thus be seen that when the handle 6 is loosened the pressure-plate 10 can be pressed down upon the meat by the handle 12 and adjust itself thereto on account of its rounded shape and its movability on the pin 11, and when it is pressed down firmly upon the meat and secured in this position by screwing tight the handle 6 it will hold fast the meat in its place. The table 2 is also provided at its front end with pins 13, by which the meat is further held securely on the table even when the pressure-plate 10 is raised up.

I am aware that meat-slicing machines have been in use before my invention, and I do not claim a machine of this class on the whole as my invention; but, What I consider as being new, and desire to secure by Letters Patent, is—

1. The combination of the table 2 of a meat-slicing machine with a pillar 3, a bolt 4 passing through the upper end of said pillar and fixed rigidly thereby, an arm 5 held movably on said pillar 3 and on bolt 4 by a forked head 5ª, a screw-threaded handle 6 screwed on the outer end of bolt 4, so as to allow the tightening up of the handle 6 against the head 5ª of arm 5 the whole as described and illustrated and for the purpose set forth.

2. In a meat-slicing machine a table 2, a pillar 3 fixed on said table, an arm 5 connected pivotally to the upper end of said pillar, a handle 6 held with female thread on the bolt 4 holding the pillar 3 and the arm 5 together so as to screw the arm tight on bolt 4, in combination with a pressure-plate 10 fixed movably to the arm 5 by a bolt 11, a handle 12 connected to the pressure-plate 10, the whole as described and illustrated and for the purpose set forth.

3. In a meat-slicing machine a table 2, a pillar 3 fixed to said table, an arm 5 held movably at the upper end of the pillar and capable of being fixed thereto rigidly by a screwed handle 6, a movable pressure-plate 10 at the outer end of said arm 5 in combination with a finger 7 extending rearwardly from the arm 5, a spring 8 fixed with one end to said extension 7 with the other to a bracket 9 extending from the table 2, the whole as described and illustrated and for the purpose set forth.

In testimony whereof I have affixed my signature in presence of two witnesses.

ALBERT LUTZMANN.

Witnesses:
   OTTO KÖNIG,
   J. A. RITTERSHAUS.